Sept. 4, 1951          H. B. KIME          2,566,338

APPARATUS FOR TESTING FIRE-RESISTANT MATERIAL

Filed April 8, 1946          2 Sheets—Sheet 1

INVENTOR.
HARRY B. KIME
BY
ATTORNEY

Sept. 4, 1951  H. B. KIME  2,566,338
APPARATUS FOR TESTING FIRE-RESISTANT MATERIAL
Filed April 8, 1946  2 Sheets-Sheet 2

INVENTOR.
HARRY B. KIME
BY
ATTORNEY

Patented Sept. 4, 1951

2,566,338

UNITED STATES PATENT OFFICE 2,566,338

APPARATUS FOR TESTING FIRE-RESISTANT MATERIAL

Harry B. Kime, Drexel Hill, Pa.

Application April 8, 1946, Serial No. 660,387

2 Claims. (Cl. 219—35)

(Granted under the act of March 3, 1883, as amended April 30, 1928; 370 O. G. 757)

This invention relates to material-testing apparatus and relates particularly to apparatus for testing the fire-resistance of flame-proofed materials.

Present apparatus uses a gas burner that is objectionable because of the variation in the heat content of the gas, uncontrollable drafts, and nonuniform characteristics of the burners.

An object of this invention is to provide a fire-resistance test apparatus in which conditions of test are controllable, and which conditions can be reproduced.

Another object is to provide a fire-resistance test apparatus that is draftless.

Another object is to provide a fire-resistance test apparatus that is simple in construction, easy to operate, and in which the heater is adjustable.

Further objects and advantages of this invention, as well as its construction, arrangement and operation, are apparent from the following description and claims in connection with the accompanying drawings, in which, Fig. 1 is a front elevational view of a fire-resistance test chamber, the door of the device being shown in an open position.

Figure 1:
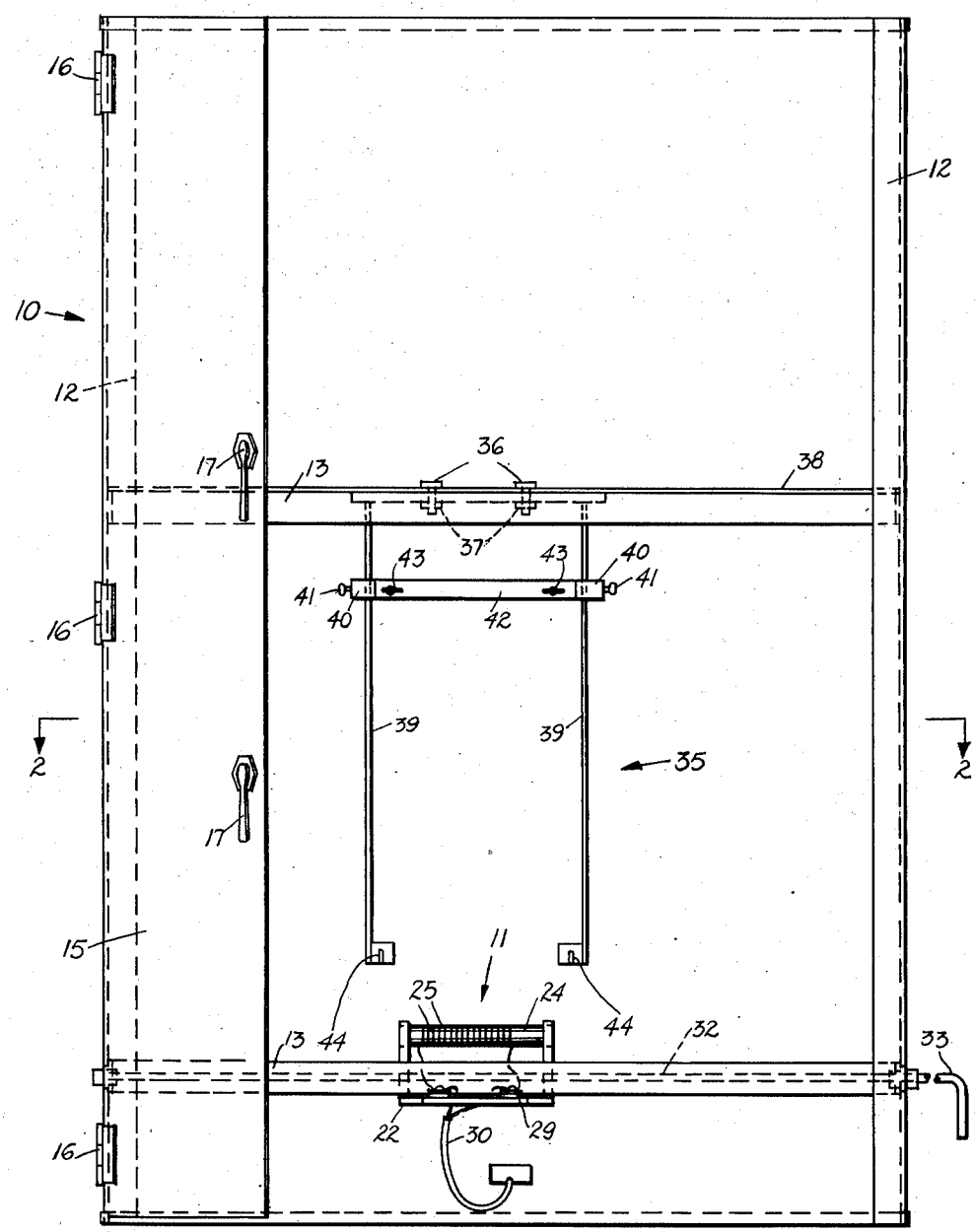
Figure 2:
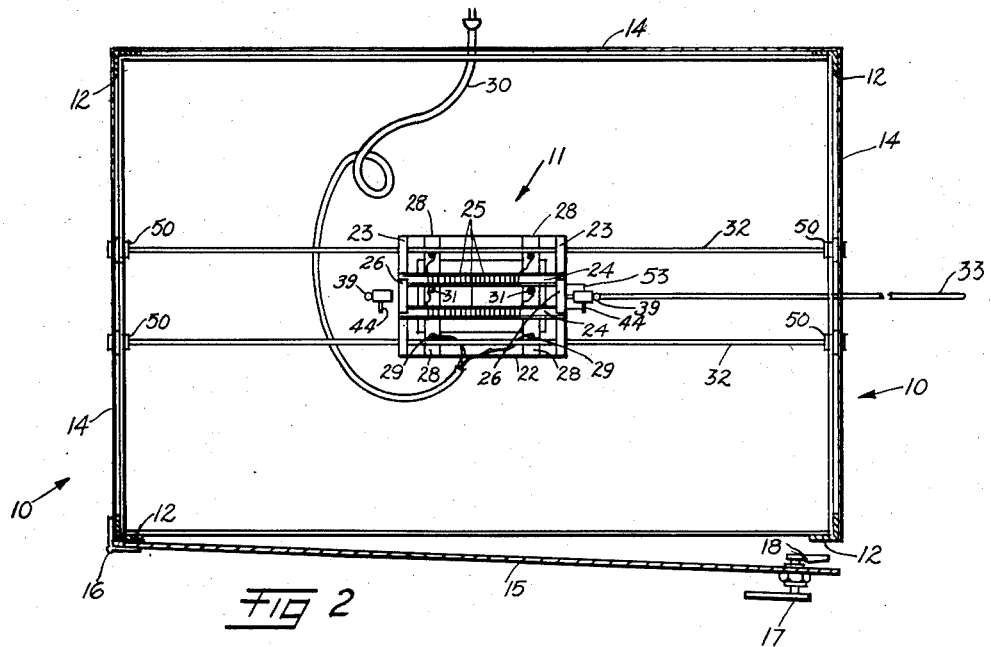
Fig. 2 is a horizontal sectional view taken along line 2—2 of Fig. 1, the door of the device being shown in unlatched position.
Figure 3:
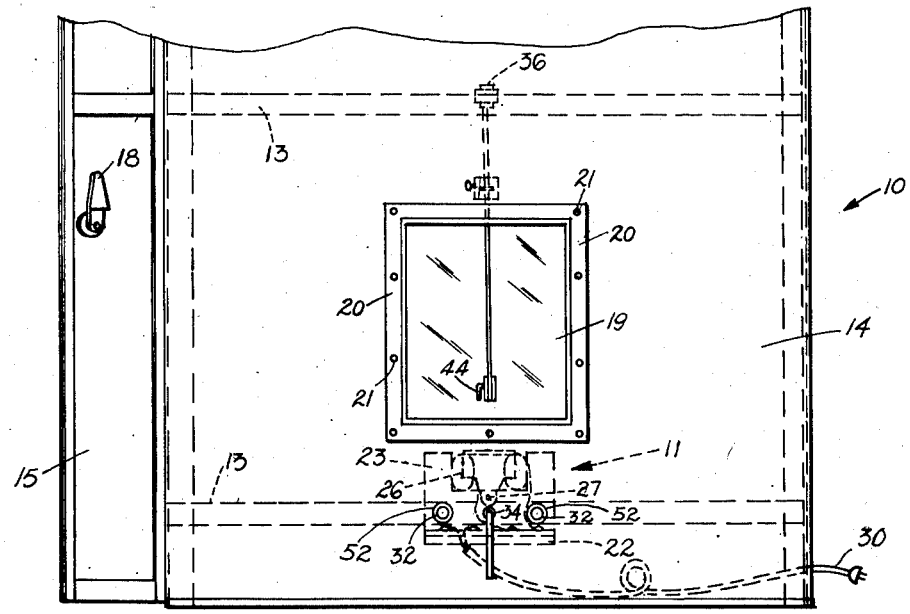
Fig. 3 is a side elevational view of Fig. 2.

Fig. 1 illustrates a test chamber 10 having electric heating unit 11 slidably contained therein. Chamber 10 is comprised of vertical angular supports 12 held rigidly together by horizontal bars 13 welded thereto. A sheet metal covering 14 encloses three sides of the chamber 10 and is tack welded to vertical supports 12. Door 15 is mounted on hinges 16, said hinges being welded to a vertical support 12. Door handles 17 and locking arms 18 permit opening or fastening of door 15, the locking arms 18 bearing against a vertical support 12.

A window 19 is secured by frame 20 and screws 21 to covering 14. Slidable electric heating unit 11 has base 22 and sides 23 attached thereto. Coil holders 24 have coils 25 wound thereon. Coil holders 24 are secured to sides 23 by clamps 26 and screws 27. Insulated conductor plates 28 suitably secured to base 22 have terminals 29 for incoming electrical cable 30 and the terminals 31 for connection to coils 25. Electric heating unit 11 is mounted for sliding movement on rods 32 that pass through bores 52 in bushings 50 that are secured to covering 14 by any suitable means. A handle 33 that projects through hole 34 in metal covering 14 is secured to heating unit 11 by a coupling 53.

A specimen holder 35 is attached by means of bolts 36 and nuts 37 to a horizontal crosspiece 38 and located so that the crosspiece 38 and electric heating unit 11 are in vertical registration with each other. Holder 35 comprises downwardly extending parallel arms 39 on which slidable material-securing bar 40 is held in place by set screws 41. Securing bar 40 is so constructed that material can be secured to it by means of clamping bar 42 that in turn is fastened to securing bar 40 by set screws 43. At the lower extremity of the parallel arms 39 are inverted L-shaped hooks 44.

When a specimen of material is to be tested for fire-resistance characteristics it is held against material-securing bar 40 by means of clamping bar 42 and set screws 43. The lower portion of the material to be tested is placed on hooks 44 and the securing bar 40 is slidably operated to bring the material into a vertically taut position. The securing bar 40 is fastened in place on the arms 39 by the set screws 41. The door 15 is closed and the electric heating unit 11 moved to one side of the specimen by means of handle 33. Cable 30 is connected with a source of electricity to heat coils 25. The hot coils 25 are moved to a position under holder 35, the results being noted through window 19.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Material-testing apparatus comprising a housing, said housing having rectangular sides and top, one of said sides being hinged and constituting a door, a cross bar in said housing parallel to said door, parallel arms suspended from said cross bar, material-holding means slidably mounted on said arms, hooks on the lower extremities of said arms, parallel bars in said housing below said hooks, said parallel bars being parallel to said door side, an electrical heating unit on said bars, and a handle attached to said heating unit and protruding through said housing.

2. Material-testing means comprising a housing, said housing being rectangular in horizontal and vertical cross section, a door forming one of the sides of said housing, a cross bar extending across said housing in the upper portion thereof, said cross bar being parallel to said door side, parallel arms depending from said cross bar, a material-securing bar slidably mounted on said parallel arms, set screws on said material-securing bar to hold said material-securing bar to said parallel arms, a clamping bar on said material-securing bar, screws holding said clamping bar to said material-securing bar, hooks on the lower extremities of said parallel bars, parallel rods extending across said housing below said hooks, said parallel rods being parallel to said door side, an electrical heater slidably mounted on said rods, and a handle attached to said heater, said handle extending beyond said housing.

HARRY B. KIME.

REFERENCES CITED

The following references are of record in the file of this patent:

UNITED STATES PATENTS

| Number | Name | Date |
|---|---|---|
| 1,096,911 | Hawxhurst | May 19, 1914 |
| 1,360,984 | Charewicz | Nov. 30, 1920 |
| 1,433,541 | Freedman et al. | Oct. 31, 1922 |
| 1,759,799 | Nickerl | May 20, 1930 |
| 2,316,378 | Witham | Apr. 13, 1943 |
| 2,426,493 | Eriksson et al. | Aug. 26, 1947 |

FOREIGN PATENTS

| Number | Country | Date |
|---|---|---|
| 80,275 | Austria | Aug. 15, 1919 |